(12) United States Patent
Gollier et al.

(10) Patent No.: US 8,294,130 B2
(45) Date of Patent: Oct. 23, 2012

(54) METHODS AND SYSTEMS FOR OPTIMIZING THE ALIGNMENT OF OPTICAL PACKAGES

(75) Inventors: Jacques Gollier, Painted Post, NY (US); Garrett Andrew Piech, Horseheads, NY (US); Daniel Ohen Ricketts, Corning, NY (US)

(73) Assignee: Corning Incorporated, Corning, NY (US)

( * ) Notice: Subject to any disclaimer, the term of this patent is extended or adjusted under 35 U.S.C. 154(b) by 378 days.

(21) Appl. No.: 12/813,610

(22) Filed: Jun. 11, 2010

(65) Prior Publication Data

US 2011/0303820 A1    Dec. 15, 2011

(51) Int. Cl.
  *G01N 21/86*    (2006.01)
(52) U.S. Cl. .................... 250/559.3; 250/221
(58) Field of Classification Search ........... 250/559.3, 250/548, 221, 205, 239; 356/256, 237.1–237.5, 356/399–401; 359/326–332
See application file for complete search history.

(56) References Cited

U.S. PATENT DOCUMENTS

| 6,577,421 | B1 | 6/2003 | Cheng et al. |
| 8,094,300 | B2 * | 1/2012 | Goers ............ 356/256 |
| 2009/0190131 | A1 | 7/2009 | Gollier et al. |
| 2009/0190624 | A1 | 7/2009 | Almoric et al. |

FOREIGN PATENT DOCUMENTS

JP    2006-267432    10/2006

* cited by examiner

*Primary Examiner* — Que T Le
(74) *Attorney, Agent, or Firm* — Joseph M. Homa

(57) ABSTRACT

A method for optimizing the alignment of an optical package includes directing a beam spot of a laser along a folded optical path and onto a waveguide portion of a wavelength conversion. The output intensity of the wavelength conversion device is measured as a position of an adjustable optical component is adjusted about a first scanning axis and a second scanning axis thereby traversing the beam spot along a first and second scan lines on the waveguide portion of the wavelength conversion device. The change in the output intensity of the wavelength conversion device is then determined based on the adjusted position of the adjustable optical component. The adjustable optical component is then positioned on the first scanning axis and the second scanning axis based on the determined changes in the output intensity of the wavelength conversion device such that the output intensity of the wavelength conversion device is maximized.

20 Claims, 1 Drawing Sheet

METHODS AND SYSTEMS FOR OPTIMIZING THE ALIGNMENT OF OPTICAL PACKAGES

BACKGROUND

The present invention generally relates to semiconductor lasers, laser controllers, optical packages, and other optical systems incorporating semiconductor lasers. More specifically, the present invention relates to methods and systems for optimizing the alignment of optical packages that include, inter alia, a semiconductor laser and a second harmonic generation (SHG) crystal or another type of wavelength conversion device.

BRIEF SUMMARY

Short wavelength light sources can be formed by combining a single-wavelength semiconductor laser, such as an infrared or near-infrared distributed feedback (DFB) laser, distributed Bragg reflector (DBR) laser, or Fabry-Perot laser, with a light wavelength conversion device, such as a second harmonic generation (SHG) crystal. Typically, the SHG crystal is used to generate higher harmonic waves of the fundamental laser signal. To do so, the lasing wavelength is preferably tuned to the spectral center of the wavelength converting SHG crystal and the output of the laser is preferably aligned with the waveguide portion at the input facet of the wavelength converting crystal.

Waveguide optical mode field diameters of typical SHG crystals, such as MgO-doped periodically poled lithium niobate (PPLN) crystals, can be in the range of a few microns. As a result, the present inventors have recognized that it can be very challenging to properly align the beam from the laser diode with the waveguide of the SHG crystal. Accordingly, one object of the present invention is to provide methods and systems for aligning components in optical packages that utilize a laser diode in conjunction with an SHG crystal or other type of wavelength conversion device to generate shorter wavelength radiation (e.g., green laser light) from a longer wavelength source (e.g., a near-infrared laser diode).

According to one embodiment of the present invention, a method for aligning an optical package having a laser, a wavelength conversion device and at least one adjustable optical component oriented to create a folded optical pathway between the laser and the wavelength conversion device includes directing a beam of the laser along the folded optical path and onto an input face of the wavelength conversion device such that the beam is incident on a waveguide portion of the wavelength conversion device. In one embodiment, the adjustable optical component may comprise an adjustable micro-electro mechanical system (MEMS) mirror used in conjunction with a lens assembly to direct a beam spot of the laser onto an input face of the wavelength conversion device. The output intensity of the wavelength conversion device is then measured as a position of the adjustable optical component is adjusted about a first scanning axis thereby traversing the beam along a first scan line on the waveguide portion of the wavelength conversion device. The change in the output intensity of the wavelength conversion device is then determined based on the adjusted position of the adjustable optical component about the first scanning axis. The adjustable optical component is then adjusted about a second scanning axis thereby traversing the beam along a second scan line on the waveguide portion of the wavelength conversion device. The change in the output intensity of the wavelength conversion device is then determined based on the adjusted position of the adjustable optical component about the second scanning axis. The adjustable optical component is then positioned on the first scanning axis and the second scanning axis based on the determined changes in the output intensity of the wavelength conversion device such that the output intensity of the wavelength conversion device is maximized.

According to another embodiment of the present invention, an optical system includes a semiconductor laser, a wavelength conversion device, a lens assembly, one or more adjustable optical components, an optical detector and a controller. The wavelength conversion device includes a wave guide portion and an input face. The optical detector is coupled to the controller and positioned to measure the output intensity of the wavelength conversion device. The lens assembly and the adjustable optical component are configured to direct a beam of the laser towards the input face of the wavelength conversion device. The controller is programmed to control the position of the adjustable optical component about a first scanning axis and a second scanning axis such that the beam spot of the laser may be positioned on the waveguide portion of the wavelength conversion device. The controller may also be configured to: apply a first signal to the adjustable optical component to adjust a position of the adjustable optical component about a first scanning axis such that the beam traverses the waveguide portion of the wavelength conversion device along a first scan line; apply a second signal to the adjustable optical component to adjust a position of the adjustable optical component about a second scanning axis such that the beam traverses the waveguide portion of the wavelength conversion device along a second scan line; determine the change in the output intensity of the wavelength conversion device based on the adjusted position of the adjustable optical component on the first scanning axis and the second scanning axis; and cooperate with the adjustable optical component to reposition the adjustable optical component on the first scanning axis and the second scanning axis based on the determined changes in the output intensity of the wavelength conversion device such that the intensity of the wavelength conversion device is maximized.

Additional features and advantages of the invention will be set forth in the detailed description which follows and, in part, will be readily apparent to those skilled in the art from that description or recognized by practicing the invention as described herein, including the detailed description which follows, the claims, as well as the appended drawings. It is to be understood that both the foregoing general description and the following detailed description present embodiments of the invention and are intended to provide an overview or framework for understanding the nature and character of the invention as it is claimed.

BRIEF DESCRIPTION OF THE DRAWINGS

The following detailed description of specific embodiments of the present invention can be best understood when read in conjunction with the following drawings, where like structure is indicated with like reference numerals and in which.

DETAILED DESCRIPTION OF THE ILLUSTRATIVE EMBODIMENTS

Figure 1:
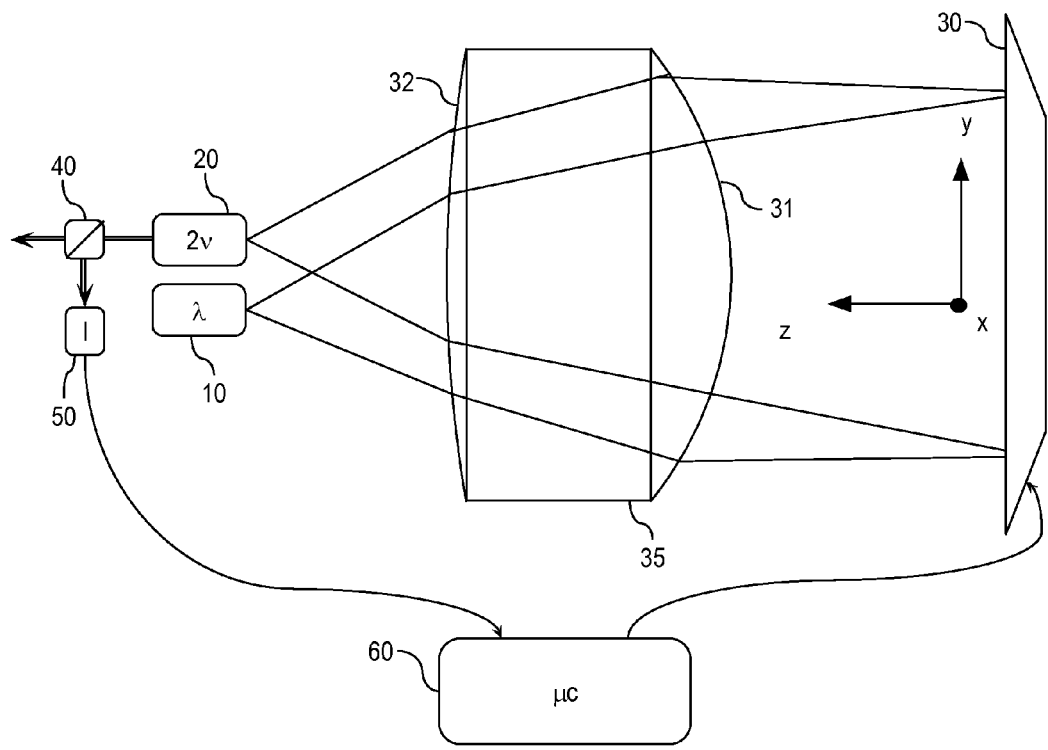
FIG. 1 is a schematic illustration of a MEMS mirror-enabled optical alignment package according to one embodiment of the present invention.

Referring initially to FIG. 1, although the general structure of the various types of optical packages in which the concepts of particular embodiments of the present invention can be incorporated is taught in readily available technical literature relating to the design and fabrication of frequency or wavelength-converted semiconductor laser sources, the concepts of particular embodiments of the present invention may be conveniently illustrated with general reference to an optical package including, for example, a semiconductor laser 10 (labeled "λ" in FIG. 1) and a wavelength conversion device 20 (labeled "2v" in FIG. 1). In the configuration depicted in FIG. 1, the near infrared light emitted by the semiconductor laser 10 is coupled into a waveguide portion of the wavelength conversion device 20 by one or more adjustable optical components 30 and a suitable lens assembly 35, which lens assembly 35 may comprise one or more optical elements of unitary or multi-component configuration. The optical package illustrated in FIG. 1 is particularly useful in generating a variety of shorter wavelength laser beams from a variety of longer wavelength semiconductor lasers and can be used, for example, as a visible laser source in a laser projection system.

Figure 2:
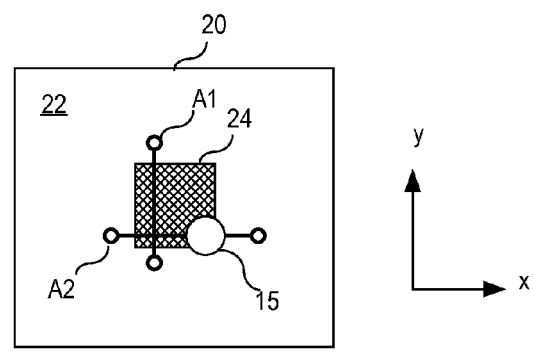
FIG. 2 is a schematic illustration of a beam incident on an input face of a wavelength conversion device.

The adjustable optical component 30 is particularly helpful because it is often difficult to focus the output beam emitted by the semiconductor laser 10 into the waveguide portion of the wavelength conversion device 20. For example, waveguide optical mode field diameters of typical SHG crystals, such as MgO-doped periodically poled lithium niobate (PPLN) crystals, can be in the range of a few microns. Referring to FIGS. 1 and 2 collectively, the lens assembly 35 cooperates with the adjustable optical component 30 to generate a beam spot 15 of comparable size on the input face 22 of the wavelength conversion device 20. The adjustable optical component 30 is configured to introduce beam angular deviation by adjusting a drive mechanism of the adjustable optical component and, as such, can be used to actively align the beam spot 15 with the waveguide portion 24 of the wavelength conversion device 20 by altering the position of the beam spot 15 on the input face 22 of the wavelength conversion device 20 until it is aligned with the waveguide portion 24 of the wavelength conversion device 20.

In one embodiment, beam alignment may be monitored by providing, for example, a beam splitter 40 and an optical detector 50 in the optical path of the wavelength conversion device 20. The optical detector 50 may be operably connected to a microcontroller or controller 60 (labeled "μc" in FIG. 1) such that an output signal from the optical detector 50 is received by the controller 60. The controller 60 may be configured to control the position or state of the adjustable optical component 30 by adjusting a drive mechanism of the adjustable optical component and, as such, position the output beam of the semiconductor laser 10 on the input face 22 of the wavelength conversion device 20. In one embodiment the controller 60 may be used to control the position or state of the adjustable optical component 30 as a function of the output signal received from the optical detector 50. In another embodiment, the controller 60 may be used to perform an alignment routine such that the beam spot 15 of the semiconductor laser 10 is aligned with the waveguide portion 24 of the wavelength conversion device 20.

The adjustable optical component illustrated schematically in FIG. 1 can take a variety of conventional or yet to be developed forms. In one embodiment, it is contemplated that the adjustable optical component is a mirror operatively coupled to a drive mechanism such that the angular orientation of the mirror may be adjusted on 2 axes such that the position of the beam spot 15 may be varied on the input face 22 of the wavelength conversion device 20. In another embodiment, it is contemplated that the drive mechanism of the adjustable optical component 30 may comprise one or more movable micro-opto-electromechanical systems (MOEMS) or micro-electro-mechanical system (MEMS) operatively coupled to a mirror such that the angular orientation of the mirror may be adjusted on at least 2 axes. The MEMS or MOEMS devices may be configured and arranged to vary the position of the beam spot 15 on the input face 22 of the wavelength conversion device 20. Since the mirror is located in the collimated or nearly-collimated beam space of the optical system, adjustment of the mirror angle will result in a change in the x/y position of the refocused beam spot at the input face of the wavelength conversion device. Used of MEMS or MOEMS devices enables adjustment of the refocused beam spot position to be done extremely rapidly over large ranges. For example, a MEMS mirror with a +/−1 degree mechanical deflection, when used in conjunction with a 3 mm focal length lens, may allow the beam spot to be angularly displaced +/−100 μm on the input face of the wavelength conversion device. The adjustment of the beam spot may be done at frequencies on the order of 100 Hz to 10 kHz due to the fast response time of the MEMS or MOEMS device. Alternatively or additionally, the adjustable optical component 30 may comprise one or more liquid lens components configured for beam steering and/or beam focusing. Still further, it is contemplated that the adjustable optical component 30 may comprise one or more mirrors and/or lenses mounted to micro-actuators. In one contemplated embodiment, the adjustable optical component takes the form of a movable or adjustable lens in the lens assembly 35 and the otherwise adjustable optical component 30 takes the form of a fixed mirror.

In the optical configuration illustrated in FIG. 1, the adjustable optical component 30 is a micro-opto-electromechanical mirror incorporated in a relatively compact, folded-path optical system. In the illustrated configuration, the adjustable optical component 30 is configured to fold the optical path such that the optical path initially passes through the lens assembly 35 to reach the adjustable optical component 30 as a collimated or nearly collimated beam and subsequently returns through the same lens assembly 35 to be focused on the wavelength conversion device 20. This type of optical configuration is particularly applicable to wavelength converted laser sources where the cross-sectional size of the laser beam generated by the semiconductor laser is close to the size of the waveguide on the input face of the wavelength conversion device 20, in which case a magnification close to one would yield optimum coupling in focusing the beam spot on the input face of the wavelength conversion device 20. For the purposes of defining and describing the present invention, it is noted that reference herein to a "collimated or nearly collimated" beam is intended to cover any beam configuration where the degree of beam divergence or convergence is reduced, directing the beam towards a more collimated state.

The lens assembly 35 can be described as a dual function, collimating and focusing optical component because it serves to collimate the divergent light output of the laser and the refocus the laser light propagating along the optical path of the package into the waveguide portion of the wavelength conversion device. This dual function optical component is well suited for applications requiring magnification factors close to one because a single lens assembly 35 is used for both collimation and focusing. More specifically, as is illustrated in FIG. 1, laser light output from the semiconductor laser 10 is, in sequence, refracted at the first face 31 of the lens assembly 35, refracted at the second face 32 of the lens assembly 35, and reflected by the adjustable optical component 30 in the direction of the lens assembly 35. Once the laser light is reflected back in the direction of the lens assembly 35, it is first refracted at the second face 32 of the lens assembly 35 and subsequently refracted at the first face 31 of the lens assembly 35, for focusing on the input face of the wavelength conversion device 20.

In particular embodiments of the present invention, the adjustable optical component 30 is placed close enough to the image focal point of the lens assembly 35 to ensure that the principle ray incident on the input face 22 of the wavelength conversion device 20 is approximately parallel to the principle ray at the output of the optical package. It may also be shown that the configuration illustrated in FIG. 1 also presents some advantages in term of aberration. Indeed, when the output face of the semiconductor laser 10 and the input face of the wavelength conversion device 20 are positioned in approximate alignment with the object focal plane of the lens assembly 35 and the output waveguide of the semiconductor laser 10 and the input waveguide of the wavelength conversion device 20 are symmetric with respect to the optical axis of the lens assembly 35, it is contemplated that anti symmetric field aberrations, such as coma, can be automatically corrected.

Referring now to FIGS. 1 and 2, in one embodiment, a method of optimizing the alignment of the beam spot 15 of the semiconductor laser 10 with the waveguide portion 24 of the wavelength conversion device 20 comprises aligning the beam spot 15 of the semiconductor laser 10 on the waveguide portion 24 of the wavelength conversion device 20. The position of the beam spot 15 on the waveguide portion 24 of the wavelength conversion device 20 is then adjusted while the output of the wavelength conversion device 20 is monitored in order to determine a change in the output intensity of the wavelength conversion device 20. The adjustable optical component 30 is then repositioned based on the determined change in the output intensity of the wavelength conversion device 20 such that the output intensity of the wavelength conversion device 20 is maximized.

As discussed herein, the output intensity of the wavelength conversion device 20 may be monitored by positioning a beam splitter 40 and optical sensor 50 proximate the output of the wavelength conversion device 20. In one embodiment, the optical sensor 50 may be a photodiode configured to measure the intensity of electro-magnetic radiation coupled through the wavelength conversion device 20. The electro-magnetic radiation may comprise infrared radiation, such as the infrared radiation emitted from the semiconductor laser 10, or visible light radiation, such as the green light emitted from the wavelength conversion device 20.

In order to optimize the alignment of the beam spot 15 with the waveguide portion 24 of the wavelength conversion device 20, the beam spot 15 of the semiconductor laser 10 is first focused on the input face 22 of the wavelength conversion device 20. This may be accomplished by positioning the lens assembly 35 relative to the wavelength conversion device 20 and the semiconductor laser 10 such that the input face 22 of the wavelength conversion device 20 and the output face of the semiconductor laser 10 are substantially co-planar with the focal plane of the lens assembly 35.

The beam spot 15 is then roughly aligned with the waveguide portion 24 of the wavelength conversion device 20. This may be accomplished by using any number of techniques to achieve alignment of the beam spot with the waveguide portion of the wavelength conversion device 20 including, without limitation, the alignment techniques disclosed in U.S. patent application Ser. No. 12/072,386 entitled "Methods And Systems For Aligning Optical Packages" which is hereby incorporated by reference.

With the beam spot 15 in rough alignment with the waveguide portion 24 of the wavelength conversion device 20, the alignment may be optimized by adjusting the position of the beam spot 15 on the waveguide portion 24 of the device while monitoring the change in the output intensity of the wavelength conversion device 20 as a result of the change in position. The position of the adjustable optical component 30 when the beam spot 15 is in rough alignment with the waveguide portion 24 of the wavelength conversion device 20 is the starting position or initial position of the adjustable optical component for purposes of optimizing alignment. Referring to FIGS. 1 and 2, the position of the beam spot 15 on the waveguide portion 24 of the wavelength conversion device 20 may be varied by adjusting the position of the adjustable optical component 30 such as when the adjustable optical component 30 is rotated about a first scanning axis. In the embodiment shown in FIG. 1 the first scanning axis corresponds to an axis extending vertically through the adjustable optical component 30 and generally parallel to the y-axis. Rotating the adjustable optical component 30 about the first scanning axis causes the beam spot 15 to traverse across the input face of the wavelength conversion device 20 along at least a portion of a first scan line A1. In the embodiment shown in FIG. 2 the first scan line A1 is a line generally parallel to the x-axis of the coordinate system shown in the figure. In one embodiment, the adjustable optical component 30 is rotated about the first scanning axis in one direction such that the beam spot 15 traverses at least a portion of the first scan line A1 in one direction. In another embodiment, the adjustable optical component 30 is rotated about the first scanning axis in two directions such that the beam spot 15 traverses at least a portion of the first scan line A1 in both directions (positive and negative directions along the x-axis). To accomplish this, the adjustable optical component 30 is rotated about the first scanning axis such that the beam spot 15 is first scanned in one direction and then scanned in a second direction. The adjustment of the position of the adjustable optical component 30 may be performed under the control of the controller 60 through an electrical signal provided to the adjustable optical component 30 by the controller.

As the position of the adjustable optical component 30 is adjusted the output intensity of the wavelength conversion device 20 is measured by the optical sensor 50 which provides a signal corresponding to the output intensity to the controller 60. Based on the signals received from the optical sensor 50, the controller 60 determines the change in the output intensity of the wavelength conversion device 20 as the beam spot 15 traverses the first scan line A1. The determined change in the output intensity may include the magnitude of the change in output intensity as well as the sign (+/−) of the change corresponding to either an increase or a decrease in the output intensity. In one embodiment, when the adjustable optical component 30 is rotated such that the beam spot 15 is scanned in two directions along the first scan line A1, the controller may determine the change in the output intensity of the wavelength conversion device 20 for each direction along the first scan line. In another embodiment, the controller may record the change in the output intensity and the corresponding adjusted position of the adjustable optical component 30 in a memory (not shown) operatively associated with the controller.

A similar procedure may be performed to determine the change in the output intensity along a second scan line A2 along the waveguide portion 24 of the wavelength conversion device 20. The second scan line A2 is generally perpendicular to the first scan line A1. Accordingly, to traverse the beam spot 15 along the second scan line A2, the position of the adjustable optical component 30 is adjusted about a second scanning axis such that the beam spot 15 traverse over the waveguide portion 24 of the wavelength conversion device 20 on the second scan line. In the embodiment shown in FIG. 1, the second scanning axis is an axis passing through the adjustable optical component 30 that is generally parallel to the x-axis of the coordinate system shown. To facilitate adjusting the position of the adjustable optical component 30 about the second scanning axis A2, the controller 60 may provide the adjustable optical component 30 with an electrical signal causing the adjustable optical component 30 to rotate about the second scanning axis. In one embodiment, the adjustable optical component 30 is rotated about the second scanning axis in one direction such that the beam spot 15 traverses at least a portion of the second scan line A2 in one direction. In another embodiment, the adjustable optical component 30 is rotated about the second scanning axis in two directions such that the beam spot 15 traverses at least a portion of the second scan line A2 in both directions (positive and negative directions along the y-axis). To accomplish this, the adjustable optical component 30 is rotated about the second scanning axis such that the beam spot 15 is first scanned in one direction and then scanned in a second direction.

As the position of the adjustable optical component 30 is adjusted about the second scanning axis, the output intensity of the wavelength conversion device 20 is measured by the optical sensor 50 which provides a signal corresponding to the output intensity to the controller 60. Based on the signals received from the optical sensor 50, the controller 60 determines the change in the output intensity of the wavelength conversion device 20 as the beam spot 15 traverses the second scan line A2. The determined change in the output intensity may include the magnitude of the change in output intensity as well as the sign (+/−) of the change corresponding to either an increase or a decrease in the output intensity. In one embodiment, when the adjustable optical component 30 is rotated such that the beam spot 15 is scanned in two directions along the second scan line A2, the controller may determine the change in the output intensity of the wavelength conversion device 20 for each direction along the second scan line. In another embodiment, the controller may record the change in the output intensity and the corresponding adjusted position of the adjustable optical component 30 in the memory operatively associated with the controller.

Adjusting a position of the adjustable optical component 30 along a first scanning axis and adjusting the position of the adjustable optical component 30 along a second scanning axis may be performed simultaneously and the controller may determine the change in the output intensity based on the adjusted position of the adjustable optical component 30 on both the first and second scanning axes.

In another embodiment, the position of the adjustable optical component 30 on the first scanning axis and the second scanning axis may be adjusted by applying a dithering signal to the adjustable optical component 30 to cause the adjustable optical component 30 to oscillate about the first scanning axis and/or the second scanning axis. For example, when the adjustable optical component 30 comprises a MEMS mirror, the controller may apply a first dithering signal to the MEMS mirror thereby causing the MEMS mirror to oscillate about the first scanning axis which, in turn, causes the beam spot 15 to scan across the waveguide portion 24 of the adjustable optical component 30 in both directions along the first scan line. In one embodiment, the adjustable optical component 30 may be oscillated at about the resonant frequency of the adjustable optical component 30. The dithering signal may be an electrical signal in which either the voltage or current of the signal oscillates over a specified time period. Accordingly, the dithering signal may be a sinusoidal signal, a square wave signal, a saw tooth signal or the like. A second dithering signal may be applied to the adjustable optical component 30 to cause the adjustable optical component 30 to oscillate about the second scanning axis which, in turn, causes the beam spot 15 to scan across the waveguide portion 24 of the wavelength conversion device 20 along the second scan line A2.

In one embodiment, when the adjustable optical component is a MEMS device, the dithering signals applied to the adjustable optical component 30 may be produced by an LC resonant tank circuit, as is known in the art and disclosed in the publication by B. Cagdaser and B. E. Boser "*Resonant drive: sense and high voltage electrostatic drive using single MEMs capacitor and low voltage electronics*," Micro Electro Mechanical System, 2005, MEMS 2005 18$^{th}$ IEEE International Conference on. 30 Jan.-3 Feb. 2005, pp. 142-146, which is incorporated herein by reference. The LC resonant tank circuit (not shown) may be operatively associated with the controller 60 such that the controller 60 selectively applies the dithering signal to the adjustable optical component 30 to oscillate the adjustable optical component 30 about the first and second scanning axes. The use of the LC resonant tank circuit allows for large scale changes to the position of the adjustable optical component 30 while only requiring relatively low amplitude input voltages. Accordingly, the use of an LC resonant tank circuit facilitates adjusting the position of the adjustable optical component 30 by large amounts while requiring only small voltage changes at the input of the circuit. This is particularly useful when the adjustable optical component is an electrostatic MEMS device where relatively large voltages (approximately 100 volts) may be required to actuate the device. While the LC resonant tank circuit provides one exemplary embodiment for providing the MEMS device with a dithering signal, it should be understood that other circuits may be used to provide dithering signals to the adjustable optical component.

In one embodiment, when a first dithering signal and a second dithering signal are used to adjust the position of the adjustable optical component 30 about the first scanning axis and the second scanning axis, the output intensity of the wavelength conversion device 20 may be measured by the optical sensor 50 and the output signal of the optical sensor may be stored in a memory operatively associated with the controller 60 as a function of time as the beam spot 15 is scanned across the waveguide portion 24 of the wavelength conversion device.

In one embodiment, when the position of the adjustable optical component 30 is adjusted on the first scanning axis or the second scanning axis such that the beam spot is scanned along the first scan line A1 or the second scan line A2 in a single direction, the controller repositions the adjustable optical component 30 on the first scanning axis and the second scanning axis based on the determined changes in the output intensity of the wavelength conversion device 20. For example, when the determined change in the output intensity of the wavelength conversion device 20 for a specific adjusted position of the adjustable optical component 30 is positive, the controller repositions the adjustable optical component 30 to the adjusted position which yielded the increase in output intensity. However, when the change in the output intensity is negative, the controller may repeat the process of adjusting the position of the optical component along the appropriate scanning axis only this time rotating the adjustable optical component 30 in a direction opposite that which produced the negative change in the output intensity. If the second adjusted position also yields a negative change in the output intensity, then the initial position of the adjustable optical component 30 on that scanning axis is the optimized position and no repositioning is necessary. If the second adjusted position results in a positive change in the output intensity, then the adjustable optical component 30 is repositioned to the second adjusted position. In any event, if the change in the output intensity of the wavelength conversion device 20 is zero, the adjustable optical component 30 is kept in its initial position.

In another embodiment, when the position of the adjustable optical component 30 is adjusted on the first scanning axis or the second scanning axis such that the beam spot 15 is scanned along the first scan line A1 or the second scan line A2 in both directions, the controller compares the determined changes in the output intensity for each direction along the scan line and repositions the adjustable optical component 30 about the scanning axis to the adjusted position corresponding to an increase in the output intensity of the wavelength conversion device 20. If neither direction yields an increase in the output intensity (e.g., when the determined change in the output intensity of the device is negative in both directions along the scan line) then the initial position of the adjustable optical component 30 yields the maximum output intensity for the wavelength conversion device 20 and no repositioning is required. Similarly, if the determined change in the output intensity is zero, (e.g., there is no increase or decrease in the output intensity of the wavelength conversion device 20 due to repositioning the adjustable optical component) then the adjustable optical component 30 is maintained at the initial position.

In another embodiment, when first and second dithering signals are used to adjust the position of the adjustable optical component 30, the controller 60 may optimize the alignment of the beam spot 15 with the waveguide portion 24 of the wavelength conversion device 20 by comparing the output signal of the optical sensor 50 with the first dithering signal and/or the second dithering signal and adjusting the position of the adjustable optical component 30 on the first scanning axis and the second scanning axis accordingly. In one embodiment, a positive change in the output intensity of the wavelength conversion device 20, as determined from the signal collected from the optical sensor 50, is compared to the change in the voltage and/or current of the dithering signal over the same time interval. The corresponding change in the voltage and/or current is used to reposition the adjustable optical component 30 on the first scanning axis and/or the second scanning axis from the initial position such that the output intensity of the wavelength conversion device 20 is increased. In another embodiment, the output signal from the optical sensor is directly compared to the first dithering signal or the second dithering signal over the same time interval. The differences in the phase of the output signal of the optical sensor and the phase of the first dithering signal or the second dithering are then used to reposition the adjustable optical component 30 on the first scanning axis and the second scanning axis such that the output intensity of the wavelength conversion device 20 is maximized.

In another embodiment, the controller may utilize the determined changes in the output intensity of the wavelength conversion device 20 in conjunction with proportional-integral-derivative (PID) control techniques, as will be apparent to one skilled in the art, to reposition the adjustable optical component 30 on the first scanning axis and the second scanning axis.

Accordingly, it should now be understood that the method for optimizing the alignment may be performed using closed-loop feed back control to adjust the position of the adjustable optical component such that the beam spot of the semiconductor laser is positioned on the waveguide portion of the wavelength conversion device to maximize the output intensity of the wavelength conversion device. Further, it will be understood that the method of optimizing the alignment of an optical package may be performed iteratively until the output intensity of the wavelength conversion device is maximized.

While specific reference has been made herein to the orientation of the first scan line, the second scan line, the first scanning axis, and the second scanning axis with respect to the coordinate system depicted in FIGS. 1 and 2, it should be understood that, unless otherwise stated herein, no particular limitation is intended as to the orientation of any particular scanning axis with reference to a specific coordinate system. However, it should be understood that the first scan line along the input face 22 of the wavelength conversion device 20 will be generally perpendicular to the second scan line along the input face 22 and the first scanning axis of the adjustable optical component 30 will be generally perpendicular to the second scanning axis of the adjustable optical component 30. Moreover, the first scanning axis of the adjustable optical component 30 will be generally perpendicular to the first scan line along the input face 22 and the second scan line of the adjustable optical component 30 will be generally perpendicular to the second scan line along the input face 22.

In practice, the alignment method described herein may be employed to optimize the alignment of the beam of the semiconductor laser with the waveguide portion of the wavelength conversion device 20 during assembly of the optical package. The alignment method described herein may also be used throughout the lifetime of the optical package to maintain alignment or realign the optical package, such as when the alignment of the semiconductor laser with the wavelength conversion device 20 is adversely effected by environmental conditions, thermal shock, mechanical shock and/or the like.

In one embodiment, the alignment method described herein may be used in conjunction with other alignment techniques during the assembly of the optical package to optimize the alignment of the beam spot 15 of a semiconductor laser 10 with the waveguide portion 24 of a wavelength conversion device 20. By way of example, during assembly of the optical package, the wavelength conversion device 20 is first assembled atop the semiconductor laser 10 such that the output face of the semiconductor laser 10 and the input face of the wavelength conversion device 20 are substantially co-planar. The adjustable optical component 30 and the lens assembly 35 are then positioned in the x/y plane and z direction with respect to the wavelength conversion device 20 and semiconductor laser 10. Each of the adjustable optical component 30 and lens assembly 35 are positioned in the x/y plane such that the centerline of each component is within a few hundred microns of the centerline between the semiconductor laser 10 and the wavelength conversion device 20.

When the focal length of the lens assembly 35 is well characterized, the lens assembly 35 and adjustable optical component 30 may be positioned in the optical package along the z-direction such that the input face 22 of the wavelength conversion device 20 and the output face of the semiconductor laser 10 are substantially in or coplanar with the object focal plane of the lens assembly 35. For example, in one embodiment, the focal length of the lens assembly 35 is about 3 mm. Therefore, the components of the optical package are positioned such that the distance between the lens assembly 35 and the input face 22 of the wavelength conversion device 20 and the output face of the semiconductor laser 10 may be about 3 mm. The adjustable optical component 30 is similarly positioned relative to the lens assembly 35. Once each of the components are properly positioned in the optical package, each of the lens assembly 35, the wavelength conversion device 20/semiconductor laser 10 combination and adjustable optical component 30 are then permanently fixed into place in the optical package using epoxy, laser welding, or other attachment techniques as may be presently known or subsequently developed.

After the components of the optical package are fixed into place, the optical package may be energized and the beam spot 15 of the semiconductor laser 10 may be roughly aligned with the waveguide portion 24 of the wavelength conversion device 20. In one embodiment, the beam spot 15 may be roughly aligned with the waveguide portion 24 by performing a raster scan of the beam spot 15 over the input face 22 of the wavelength conversion device 20 while monitoring the output intensity of the wavelength conversion device 20. The beam spot 15 is then positioned according to the output intensity of the wavelength conversion device 20 such that the beam spot 15 is roughly aligned with the waveguide portion 24 of the wavelength conversion device 20. In another embodiment, the beam spot 15 may be generally aligned with the waveguide portion 24 by utilizing the alignment method disclosed in U.S. patent application Ser. No. 12/072,686.

Thereafter, the method of optimizing the alignment of an optical package described herein may be performed by the controller to optimize the position of the beam spot 15 with respect to the waveguide portion 24 of the wavelength conversion device 20. More specifically, the controller 60 may be configured to carry out the steps of adjusting the position of the adjustable optical component 30 on the first scanning axis and the second scanning axis by providing signals to the adjustable optical component 30. The controller 60 may also be configured to receive signals from the optical sensor 50 corresponding to the change in the output intensity of the wavelength conversion device 20 due to the change in position of the beam spot 15 on the waveguide portion 24 of the wavelength conversion device 20 caused by adjusting the position of the adjustable optical component 30. Using the signals received from the optical sensor 50, the controller 60 repositions the adjustable optical component 30 such that the output of the wavelength conversion device 20 is maximized thereby performing closed-loop feedback control to optimize alignment of the beam spot 15 with the wavelength conversion device. It should now be understood that the alignment method described herein may be used to align the optical package during assembly of the optical package or after the entire optical package has been assembled and the optical package is powered on for the first time and every time thereafter.

In another embodiment, when the focal length of the lens assembly 35 is not well characterized, the closed-loop alignment method of the present invention may be used to fine tune and optimize the alignment of the beam spot 15 with the wavelength conversion device 20 as each component of the optical package is positioned and brought into alignment. For example, when the focal length of the lens assembly 35 is not well characterized, the lens assembly 35 and adjustable optical component 30 may be inserted into the optical package and positioned in rough alignment with the wavelength conversion device 20 and semiconductor laser 10. In this technique, the alignment of the components in the x/y plane need only be within a few hundred microns while the alignment of the lens assembly 35 with the input face 22 of the wavelength conversion device 20 should be close to one focal length of the lens assembly 35. With the components in rough alignment, the optical package is powered on and the beam spot 15 is generally aligned with the waveguide portion 24 of the wavelength conversion device 20 using one or more of the alignment techniques described hereinabove.

The position of the lens assembly 35 and the adjustable optical component 30 may then be adjusted in the z direction to optimize the properties of the optical package while the controller 60 performs the alignment optimization method described herein to dynamically maintain the alignment of the beam spot 15 with the wavelength conversion device 20 as the position of each of the lens assembly 35 and the adjustable optical component 30 are adjusted. Once the components of the optical package are properly oriented in the z direction, each component is fixed in to place. The controller 60 may then perform the alignment optimization method described herein to optimize the alignment of the beam spot 15 with the waveguide portion 24 such that the output of the wavelength conversion device 20 is maximized.

In yet another embodiment, the method of optimizing the alignment of a beam spot 15 with a waveguide portion 24 of a wavelength conversion device 20 may be periodically performed after the optical package has been assembled to check beam alignment and/or realign the beam spot 15 with the waveguide portion 24. For example, during the life of an optical package, the device may be exposed to various environmental and mechanical conditions, such as heat, humidity, vibration, mechanical shock and the like, which may adversely effect the alignment of the beam 15 with the waveguide portion 24 of the wavelength conversion device. The methods described herein may be periodically employed to check the alignment of the beam with the waveguide portion 24 of the wavelength conversion device 20 and, as necessary, realign the beam 15 with the waveguide portion of the wavelength conversion device 20.

For example, the alignment optimization method described herein may be employed periodically while the laser is switched on. In one embodiment, the controller 60 may be configured to perform the alignment methods of the present invention at regular time intervals. In another embodiment, the controller 60 may be programmed to perform the alignment method after a specific event or condition occurs. For example, when the optical package is employed in a laser projection device, the controller 60 may be programmed to perform the alignment method once for every image frame displayed or projected.

In yet another embodiment, the alignment optimization method described herein may be initiated by a user. For example, the optical package may be configured with a user interface (not shown) comprising buttons, switches, touch pads and the like which may be operatively connected to the controller 60. The controller may be configured to perform the alignment optimization method upon receiving a specified user input from the user interface. Accordingly, the user may initiate the alignment optimization method at any time so long as the optical package is powered on.

It should now be understood that the method described herein is suitable for optimizing the alignment of a beam of a semiconductor laser with a waveguide portion of a wavelength conversion device. The alignment method is well suited for optimizing the alignment of the beam with the wavelength conversion device during initial assembly of the optical package or at anytime throughout the lifecycle of the optical package.

It is contemplated that the methods of the present invention may be applicable to color image-forming laser projection systems, laser-based displays such as heads-up displays in automobiles, or any laser application where optical alignment and/or wavelength tuning are issues. It is further contemplated that the alignment methods discussed herein will have utility in conjunction with a variety of semiconductor lasers, including but not limited to DBR and DFB lasers, Fabry-Perot lasers, and many types of external cavity lasers.

It is to be understood that the preceding detailed description of the invention is intended to provide an overview or framework for understanding the nature and character of the invention as it is claimed. It will be apparent to those skilled in the art that various modifications and variations can be made to the present invention without departing from the spirit and scope of the invention. Thus, it is intended that the present invention cover the modifications and variations of this invention provided such modifications and variations come within the scope of the appended claims and their equivalents.

It is noted that terms like "preferably," "commonly," and "typically," if utilized herein, should not be read to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

It is noted that recitations herein of a component being "programmed" in a particular way, "configured" or "programmed" to embody a particular property or function, are structural recitations as opposed to recitations of intended use. More specifically, the references herein to the manner in which a component is "programmed" or "configured" denotes an existing physical conditions of the component and, as such, is to be taken as a definite recitation of the structural characteristics of the component. For example, references herein to a lens assembly and an adjustable optical component being "configured" to direct a laser beam in a particular manner denotes an existing physical condition of the lens assembly and the adjustable optical component and, as such, is to be taken as a definite recitation of the structural characteristics of the lens assembly and the adjustable optical component.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The invention claimed is:

1. A method for optimizing the alignment of an optical package comprising a laser, a wavelength conversion device and at least one adjustable optical component oriented to create a folded optical pathway between the laser and the wavelength conversion device, the method comprising:
   directing a beam spot of the laser along the folded optical path and onto an input face of the wavelength conversion device with the adjustable optical component such that the beam spot is incident on a waveguide portion of the wavelength conversion device;
   measuring an output intensity of the wavelength conversion device;
   adjusting a position of the adjustable optical component about a first scanning axis thereby traversing the beam spot across the waveguide portion of the wavelength conversion device along a first scan line on the waveguide portion of the wavelength conversion device;
   determining a change in an output intensity of the wavelength conversion device based on an adjusted position of the adjustable optical component about the first scanning axis;
   adjusting the position of the adjustable optical component about a second scanning axis thereby traversing the beam spot across the waveguide portion of the wavelength conversion device along a second scan line;
   determining a change in the output intensity of the wavelength conversion device based on the adjusted position of the adjustable optical component about the second scanning axis; and
   repositioning the adjustable optical component on the first scanning axis and the second scanning axis based on the determined changes in the output intensity of the wavelength conversion device such that the alignment of the beam spot with the waveguide portion of the wavelength conversion device is optimized and the output intensity of the wavelength conversion device is maximized.

2. The method of claim 1 wherein, to adjust the position of the adjustable optical component about the first scanning axis or the second scanning axis, at least one electrical signal is provided to the adjustable optical component thereby causing the rotation of the adjustable optical component about the first scanning axis and/or the second scanning axis.

3. The method of claim 1 wherein:
   the position of the adjustable optical component about the first scanning axis is adjusted such that the beam spot traverses the first scan line on the waveguide portion of the wavelength conversion device in a first direction and a second direction;
   determining the change in the output intensity of the wavelength conversion device based on the adjusted position of the adjustable optical component about the first scanning axis comprises determining a direction along the first scan line corresponding to an increase in the output intensity of the wavelength conversion device;
   the position of the adjustable optical component about the second scanning axis is adjusted such that the beam spot traverses the second scan line on the waveguide portion of the wavelength conversion device in a first direction and a second direction; and
   determining the change in the output intensity of the wavelength conversion device based on the adjusted position of the adjustable optical component about the second scanning axis comprises determining a direction along the second scan line corresponding to an increase in the output intensity of the wavelength conversion device.

4. The method of claim 1 wherein the adjustable optical component is repositioned on the first scanning axis and the second scanning axis based on a sign of the change in the output intensity of the wavelength conversion device as the beam spot is traversed along the first scan line or the second scan line.

5. The method of claim 1 wherein adjusting the position of the adjustable optical component about the first scanning axis and adjusting the position of the adjustable optical component about the second scanning axis are performed simultaneously.

6. The method of claim 1 wherein the position of the adjustable optical component about the first scanning axis is adjusted by applying a first dithering signal to the adjustable optical component to oscillate the adjustable optical component about the first scanning axis; and wherein the position of the adjustable optical component about the second scanning axis is adjusted by applying a second dithering signal to the adjustable optical component to oscillate the adjustable optical component about the second scanning axis.

7. The method of claim 6 wherein the adjustable optical component is repositioned on the first scanning axis based on the change in the output intensity of the wavelength conversion device with respect to the first dithering signal and the adjustable optical component is repositioned on the second scanning axis based on the change in the output intensity of the wavelength conversion device with respect to the second dithering signal.

8. The method of claim 6 wherein the adjustable optical component is repositioned on the first scanning axis based on the change in the output intensity of the wavelength conversion device with respect to a change in at least one of a voltage or a current of the first dithering signal and the adjustable optical component is repositioned on the second scanning axis based on the change in the output intensity of the wavelength conversion device with respect to at least one of a change in a voltage or a current of the second dithering signal.

9. The method of claim 6 wherein the adjustable optical component is oscillated about the first scanning axis and the second scanning axis at about a resonant frequency of the adjustable optical component.

10. The method of claim 6 wherein the first dithering signal and the second dithering signal are oscillating signals.

11. The method of claim 1 wherein the optical package further comprises a lens assembly and wherein the beam spot of the laser is directed through the lens assembly which focuses the beam spot onto the adjustable optical component and wherein the beam spot is reflected by the adjustable optical component back through the lens assembly thereby focusing the beam spot onto the waveguide portion of the wavelength conversion device.

12. The method of claim 11 wherein the lens assembly collimates or nearly collimates the beam spot of the laser prior to the beam spot being reflected by the adjustable optical component.

13. The method of claim 11 wherein the lens assembly comprises an adjustable lens component as the adjustable optical component the optical package further comprises a fixed mirror positioned along an optical path between the laser and the wavelength conversion device.

14. The method of claim 1 wherein the optical package further comprises a controller programmed to control a position or state of the adjustable optical component and an optical detector for measuring a wavelength converted output of the wavelength conversion device as the beam spot traverses the waveguide portion of the wavelength conversion device.

15. The method of claim 14 wherein the controller controls a position of the adjustable optical component by providing at least one signal to the adjustable optical component such that the at least one signal positions the adjustable optical component about at least one of the first scanning axis and/or the second scanning axis.

16. The method of claim 14 wherein the optical detector is operatively coupled to the controller such that the optical detector provides a signal to the controller corresponding to the output intensity of the wavelength conversion device and wherein the controller utilizes the signal received by the controller to determine the change in the output intensity of the wavelength conversion device based on the adjusted position of the adjustable optical component about the first scanning axis and the second scanning axis.

17. The method of claim 14 wherein the controller is programmed utilize proportional, integral, derivative control techniques in conjunction with the determined changes in the output intensity of the wavelength conversion device to reposition the adjustable optical component about the first scanning axis and the second scanning axis.

18. The method of claim 1 wherein the adjustable optical component comprises a mirror operatively coupled to a drive mechanism such that the angular orientation of the mirror is adjustable.

19. The method of claim 18 wherein the drive mechanism comprises a micro-opto-electromechanical system or a micro-electro-mechanical system.

20. An optical system comprising a semiconductor laser, a wavelength conversion device, a lens assembly, one or more adjustable optical components, an optical detector, and a controller, wherein the wavelength conversion device comprises a waveguide portion and an input face, the optical detector is coupled to the controller and positioned to measure the output intensity of the wavelength conversion device, the lens assembly and the adjustable optical component are oriented to create a folded optical pathway between the semiconductor laser and the wavelength conversion device and configured to direct a beam spot of the semiconductor laser towards the input face of the wavelength conversion device, and the controller is programmed to:

cooperate with the adjustable optical component to control a position or state of the adjustable optical component about a first scanning axis and a second scanning axis;

apply a first signal to the adjustable optical component to adjust a position of the adjustable optical component about a first scanning axis such that the beam spot traverses the waveguide portion of the wavelength conversion device along a first scan line;

apply a second signal to the adjustable optical component to adjust a position of the adjustable optical component on the second scanning axis such that the beam spot traverses the waveguide portion of the wavelength conversion device along a second scan line;

determine a change in the output intensity of the wavelength conversion device based on an adjusted position of the adjustable optical component on the first scanning axis and the second scanning axis; and cooperate with the adjustable optical component to reposition the adjustable optical component on the first scanning axis and the second scanning axis based on the determined changes in the output intensity of the wavelength conversion device such that the output intensity of the wavelength conversion device is maximized.

* * * * *